(12) United States Patent
Huang

(10) Patent No.: US 9,613,434 B2
(45) Date of Patent: Apr. 4, 2017

(54) VISUALIZATION OF SIZE OF OBJECTS

(71) Applicant: Empire Technology Development LLC, Wilmington, DE (US)

(72) Inventor: Shuli Huang, Shandong (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 23 days.

(21) Appl. No.: 14/376,532

(22) PCT Filed: Dec. 12, 2013

(86) PCT No.: PCT/CN2013/089170
§ 371 (c)(1),
(2) Date: Aug. 4, 2014

(87) PCT Pub. No.: WO2015/085526
PCT Pub. Date: Jun. 18, 2015

(65) Prior Publication Data
US 2015/0339832 A1 Nov. 26, 2015

(51) Int. Cl.
G06T 7/60 (2006.01)
G06T 3/40 (2006.01)
G06T 3/20 (2006.01)
G01B 11/02 (2006.01)
G06K 9/00 (2006.01)
G06K 9/42 (2006.01)

(52) U.S. Cl.
CPC .............. *G06T 7/602* (2013.01); *G01B 11/02* (2013.01); *G01B 11/022* (2013.01); *G06K 9/00671* (2013.01); *G06K 9/42* (2013.01); *G06T 3/20* (2013.01)

(58) Field of Classification Search
None
See application file for complete search history.

(56) References Cited

U.S. PATENT DOCUMENTS

| | | | |
|---|---|---|---|
| 5,937,213 A | 8/1999 | Wakabayashi et al. |
| 7,672,009 B2 | 3/2010 | Ciccarelli |
| 2011/0157407 A1 | 6/2011 | Lin et al. |

FOREIGN PATENT DOCUMENTS

| | | | |
|---|---|---|---|
| CN | 102102978 A | 6/2011 |
| CN | 103162620 A | 6/2013 |

OTHER PUBLICATIONS

LifeSizer, Inc. "LifeSizer Demo UncommonGoods", https://www.youtube.com/watch?v=9noPOF7XGrw, Published on Nov. 5, 2012, retrieved on Nov. 30, 2015.*

(Continued)

*Primary Examiner* — Zhengxi Liu
(74) *Attorney, Agent, or Firm* — Brundidge & Stanger, P.C.

(57) ABSTRACT

In accordance with some examples, when an image of an object is displayed at a display device, responsive to one or more user inputs, a computing device may be configured to adjust the image so that the object in the adjusted image approximates its actual size. A scale of a representative length may then be generated on the image, responsive to one or more other user inputs, such that the actual size of the object is visualized based on the scale.

18 Claims, 5 Drawing Sheets

(56) References Cited

OTHER PUBLICATIONS

"Guide to Map Scale" http://groundwater.fullerton.edu/Maps,_Scale,_GIS_and_GPS/Guide_to_Map_Scale.html. Archived on Jun. 12, 2010. Retrieved on Nov. 29, 2015 from <https://web.archive.org/web/20100612160211/http://groundwater.fullerton.edu/Maps,_Scale,_GIS_and_GPS/Guide_to_Map_Scale.html>.*

International Search Report and Written Opinion from International Application No. PCT/CN13/089170 mailed Jun. 5, 2014.

* cited by examiner

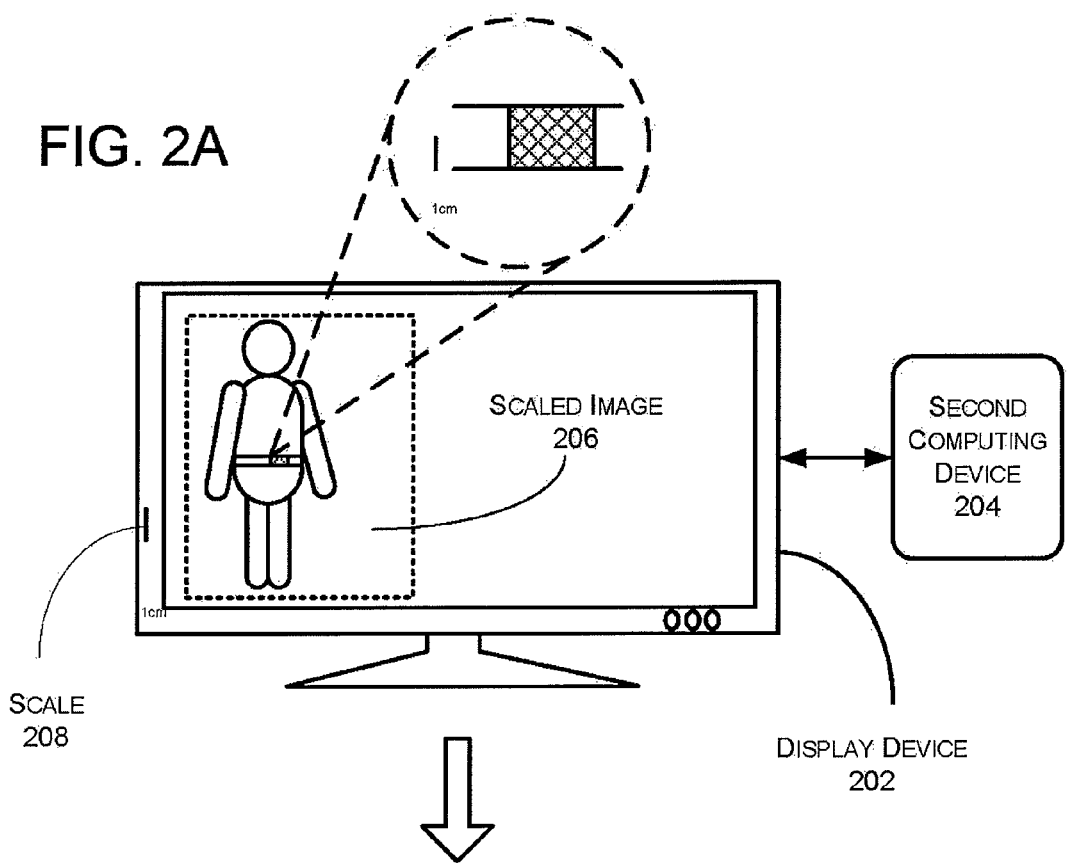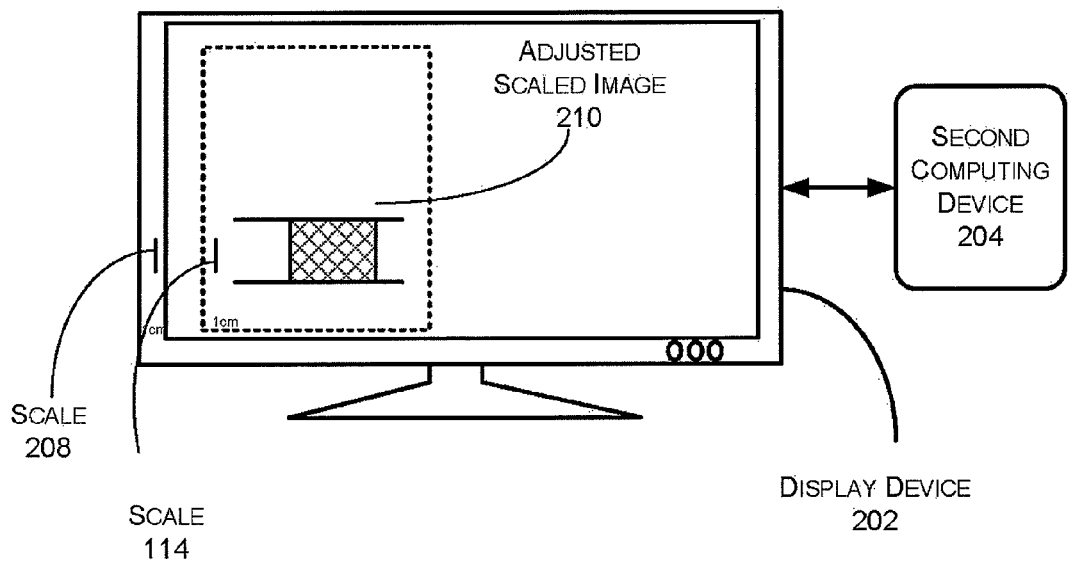
FIG. 2A
FIG. 2B

VISUALIZATION OF SIZE OF OBJECTS

CROSS-REFERENCE TO RELATED APPLICATION

This Application is the U.S. National Stage filing under 35 U.S.C. §371 of PCT Application Ser. No. PCT/CN13/089170 filed on Dec. 12, 2013. The disclosure of the PCT Application is hereby incorporated herein by reference in its entirety.

TECHNICAL FIELD

The technologies described herein pertain generally to visualizing an actual size of an object included in an image.

BACKGROUND

Unless otherwise indicated herein, the approaches described in this section are not prior art to the claims in this application and are not admitted to be prior art by inclusion in this section.

When an image is displayed on a display, an object included in the image is typically not displayed in accordance with its actual size. Thus, it may be difficult for a viewer to visualize the object in its actual size due to the size of the display. For example, an image that includes a person is likely not displayed in a manner to depict the actual size of the person and, therefore, the viewer would likely have difficulty in visualizing the person's actual height based solely on the depiction of the person in the image.

SUMMARY

Technologies are generally described for visualizing a real or actual size of an object displayed in an image. The various techniques described herein may be implemented in various methods, computer-readable mediums, computer programmable products, and/or systems.

In some examples, various embodiments may be implemented as methods. Some methods may include generating a reference scale; displaying an image, the image including an object; responsive to a first input, adjusting the displayed image, wherein the object in the adjusted image approximates an actual size of the object; and, responsive to a second input, generating a first scale that depicts a representative length on the image based on the reference scale, such that the actual size of the object is visualized based on the first scale.

In some examples, various embodiments may be implemented as computer-readable mediums having executable instructions stored thereon. Some computer-readable mediums may store instructions that, when executed, cause one or more processors to perform operations including displaying an image that includes at least an object; responsive to a first input, adjusting the displayed image, wherein the object in the adjusted image approximates an actual size of the object; and responsive to a second input, generating a scale on the image, wherein the scale depicts a representative length.

In yet other examples, some computer-readable mediums may store instructions that, when executed, cause one or more processors to perform operations including displaying a scaled version of an image that includes a first scale the depicts a known length; displaying the scaled version of the image on a display screen, the display screen having an indication of a second scale; and, responsive to an input, adjusting the size of the scaled version of the image such that the first scale approximates the second scale.

In some examples, various embodiments may be implemented as systems. Some systems may include a first display device configured to display an image that includes at least an object; a first display controller configured to, responsive to a first input, adjust a size of the image, wherein the object included in the adjusted image approximates an actual size of the object, and responsive to a second input, display a first scale on the adjusted image, the first scale depicting a representative length; a second display device configured to display the image with the first scale displayed thereon, wherein the second display device having an indication of a second scale; and a second display controller configured to, responsive to a third input, adjust a size of the displayed image such that the first scale approximates the second scale.

In yet other examples, some systems may include a display device configured to display a scaled version of an image that includes a first scale that depicts a known length, wherein the display device has an indication of a second scale; and a display controller configured to adjust the displayed scaled version of the image, responsive to one or more inputs, such that the first scale approximates the second scale.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings:

FIGS. 2A and 2B show an example system on which visualization of size of objects may be implemented;

DETAILED DESCRIPTION

Figure 1:
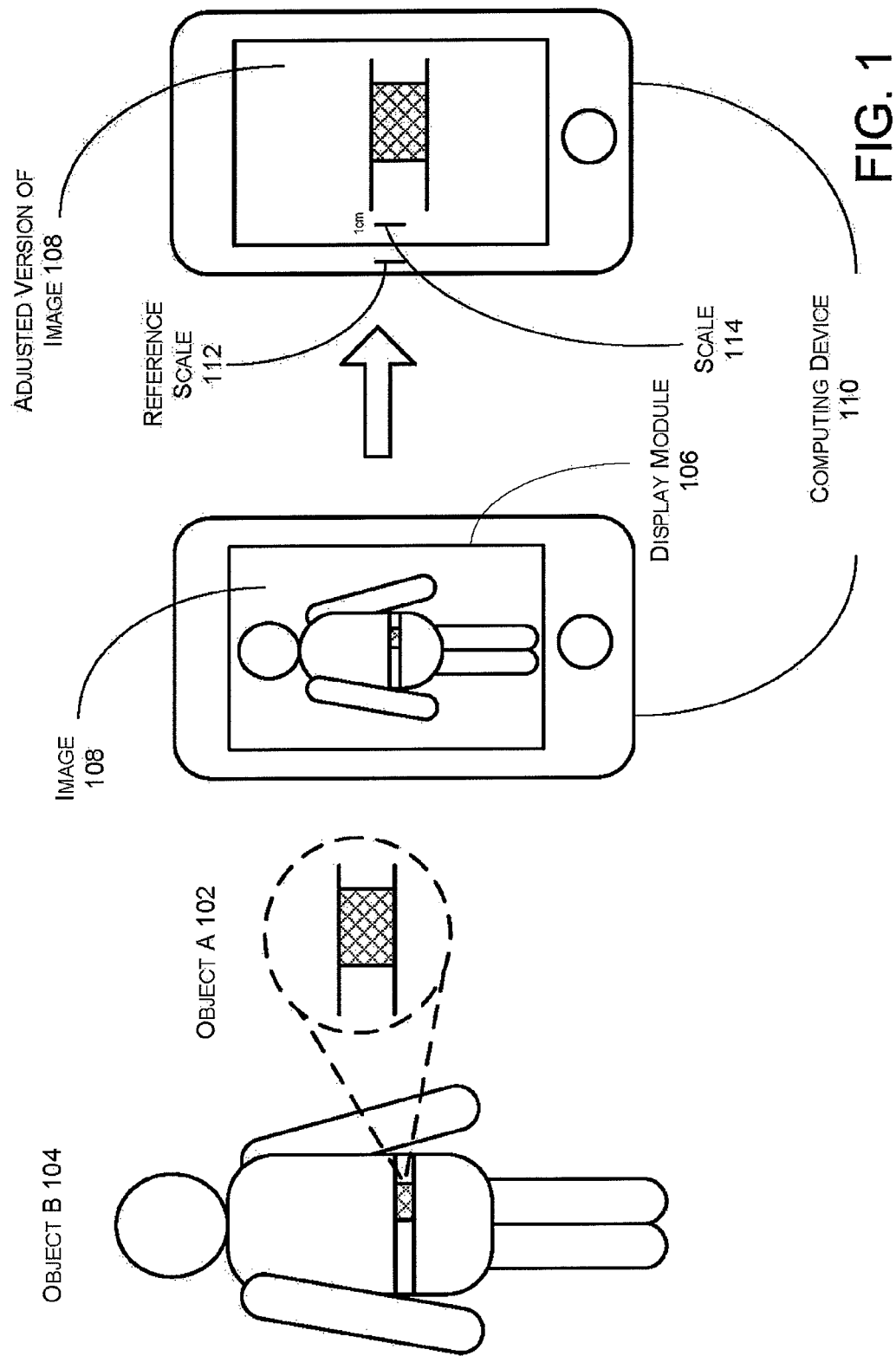
FIG. 1 shows an example computing device by which visualization of size of objects maybe implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

When viewing an image that is being displayed, it may be difficult to realize or appreciate the real or actual size of an object or objects that are included in the image. This may be due to different output methods that are being used to display the image. For example, the size of the image displayed may be different when displayed on a display screen or when printed. The size of the image displayed may be different when displayed on two different display screens, or even when displayed on the same display screen but at two different times.

Briefly stated, technologies are described to provide a baseline (for example, a scale) on a displayed image to allow a viewer of the displayed image to visualize, feel, appreciate, etc., the real or actual size of objects being displayed as part of the displayed image. In accordance with some embodiments, a reference scale may be established. The reference scale may be of any arbitrary length, such as, by way of example, 0.5 cm, 1 cm, etc., and may depend on the size of the display screen on which the image is to be displayed. That is, the reference scale should be of a length that can be entirely visualized or indicated on the display screen. In some embodiments, the length of the reference scale may be determined using the size (for example, the pixel arrangement) of the display screen. The length of the reference scale and the length that the reference scale represents (representative length) is the same. For example, if the length of the reference scale is 1 cm, the reference scale represents a length or size of 1 cm.

Subsequently, when an image is displayed on the display screen, a viewer may adjust the size of the displayed image such that an object or detail that is being displayed in the image is of, or approximates, the object's or detail's actual or real size. Then, a scale having the same length as the reference scale may be generated on the adjusted image. The scale generated on the adjusted image is based on the reference scale, the scale on the adjusted image will represent the same length as the representative scale. The scale on the adjusted image will allow viewers of the displayed image to visualize the actual or real size of objects included in and displayed as part of the displayed image. Even when the size of the displayed image is altered or changed, since the scale on the altered or changed image will also be altered or changed proportionate to the displayed image, viewers of the altered or changed image will still be able to visualize the actual or real size of objects being displayed as part of the displayed altered or changed image. This is because the scale on the unaltered or unchanged image and the scale on the altered or changed image represent the same length.

Moreover, even when the image having the scale is displayed on another, different display screen, maybe of a different size, by providing a scale of the same length as the reference scale on this display screen, viewers will be able to adjust the displayed image as necessary to visualize the actual or real size of objects included in and displayed as part of the displayed image. For example, a viewer can adjust the size of the displayed image such that the length of the scale on the image equals or closely approximates the length of the scale provided on the display screen.

FIG. 1 shows an example computing device 110 by which visualization of size of objects maybe implemented, arranged in accordance with at least some embodiment described herein. As depicted, computing device 110 includes a display module 106 on which an image 108 may be displayed. Image 108 may include an object A 102 and object B 104 and may have a scale 114 displayed thereon. Further, a reference scale 112 may be generated to depict a representative length for drawing or generating scale 114.

As referenced herein, a scale may refer to a visible line that represents a length that may be utilized as a basis to visualize or estimate the actual size of an object depicted in the image.

As referenced herein, a representative length of the scale may refer to a length that the scale represents. The representative length may be set in terms of a measure of length, e.g., inches, centimeters, a number of pixels, etc.

It is noted that, when displayed on an image, the scale may actually be of a length that is different than the representative length. For example, even though the representative length may be 1 cm, the displayed length of a scale displayed on an image may be 0.5 cm. However, in the example, the 0.5 cm scale may still be intended to represent 1 cm. Thus, the 0.5 cm scale is an example of a displayed length of a scale, which may or may not be the same as the representative length.

As referenced herein, a scaled version of an image may refer to a version of the image that also includes a depiction of a scale of the representative length.

As reference herein, an adjusted version of an image may refer to a version of the image that is altered, in response to one or more user inputs, by a display controller or a computing device.

Object A 102 may refer to a visible object depicted in image 108. As non-limiting examples, object A 102 may include a belt buckle, a ring, a fish hook, a knob, etc. Object A 102 may further refer to sub-components of object A 102, such as a prong or a design feature of the belt buckle, a jewel in the ring, a curvature in the fish hook, a scratch on the knob, etc.

Object B 104 may also refer to a visible object depicted in image 108, but of a larger size than object A 102. Non-limiting examples of object B 104 may include a person wearing the belt buckle, a hand on which the ring is worn, a fishing line on which the fishing hook is attached, a door on which the knob is attached, etc.

Display module 106 may refer to a module of computing device 110 that may be configured to display an image or a portion of the image that includes object A 102, e.g., image 108. In some examples, display module 106 may be integrated in computing device 110 as, e.g., a screen of a mobile phone. Alternatively, display module 106 may refer to a separate display device communicatively coupled to computing device 110. Via an input component of computing device 110, a user may adjust, e.g., zoom in, zoom out, and/or pan vertically or across, image 108 displayed on display module 106. Non-limiting examples of display module 106 may include a LCD monitor, a touch screen, a TV screen, etc.

Image 108 may refer to a visual representation, digital or analog, that depicts at least object A 102. Image 108 may be captured by a camera and displayed by display module 106. Typically, image 108 may include multiple pixels that may serve as a basis for estimate a size of object A 102. Each of the multiple pixels may be assigned with a color and the multiple pixels in combination, thus, may compose image 108.

Computing device 110 may refer to a device configured to transmit data to display module 106, receive data from display module 106, and/or to process computing tasks. In some examples, computing device 110 may be configured to retrieve image 108 from an internal or an external data storage. Alternatively or in addition, computing device 110 may include a camera configured to display image 108 on display module 106. Computing device 110 may further include the aforementioned input module for the user to adjust the displayed image by, e.g., zooming in, zooming out, or panning image 108 vertically or across display module 106. The input module may include a touch screen, a keyboard, a mouse, etc. Non-limiting examples of computing device 110 may include a laptop, a mobile phone, a tablet computer, etc. In at least some examples, computing device 110 may be referred to as a display controller.

In some examples, computing device 110 may be configured, in response to one or more inputs from the user, to adjust image 108 to an extent that object A 102 approximates its actual size. The adjusted version of image 108 may be displayed on display module 106. For example, responsive to the user's zooming or panning operations, computing device 110 may adjust image 108 such that a portion of image 108, e.g., object A 102, may be displayed in close approximation to its actual size. As shown in FIG. 1, the depiction of object A 102, e.g., the belt buckle, in image 108 is magnified, i.e., zoomed in, and therefore intended to be displayed to be substantially close to the actual size of the actual belt buckle, as viewed by the user.

Scale 114 may refer to a visible line that represents a length. Scale 114 may be generated on the adjusted version of image 108 to serve as a basis to facilitate visualization of the object in its actual size in relation to the size of the display, e.g., the size of display module 106, on which the image is being displayed. Scale 114 may be generated in response to one or more user inputs via computing device 110. In accordance with some embodiments, the representative length depicted by scale 114 may be 1 cm as shown in FIG. 1.

In some embodiments, when image 108 is adjusted so that object A 102 is displayed in at least close approximation to its actual size, computing device 110 may generate scale 114 on the adjusted version of image 108 in response to one or more user inputs. In some other embodiments, computing device 110 may juxtapose scale 114 to the displayed object A 102 so that object A 102 may be visualized to a viewer in relation to the juxtaposed scale 114.

In some examples, prior to the generation of scale 114, reference scale 112 may be pre-generated on display module 106 or marked on a physical frame of display module 106. Reference scale 112 may serve as a basis for computing device 110 to determine a length of scale 114. That is, scale 114 may be generated to be the same length as reference scale 112. In some other examples, scale 114 may be generated to be the representative length of scale 114 on display module 106. Such generating may be performed in accordance with currently existing methods. For example, a ruler may be displayed in the margin of a Microsoft Word® document in its actual size when the zoom level of the document is set to 100%.

In further examples, computing device 110 may be configured to estimate an actual size of object A 102 based on the representative length of scale 114, an actual count of pixels of scale 114 on the adjusted version of image 108, and an actual count of pixels of object A 102. In even further examples, computing device 110 may be configured to estimate the actual size of other objects visualized by image 108. Such objects may include object B 104, which may be larger than object A 102, e.g., a person wearing a belt buckle; or such objects may include sub-components of object A 102, e.g., a prong attached to the belt buckle. Such estimates may also be made based on the representative length of scale 114, the actual count of pixels of scale 114, and the actual count of pixels of the other objects.

In further examples, the scaled version of image 108 may be transmitted to a second computing device, e.g., second computing device 204. The scaled version of image 108 may or may not be transmitted in the same size as the adjusted version of image 108.

FIGS. 2A and 2B show an example system 200 on which visualization of size of objects may be implemented, arranged in accordance with at least some embodiment described herein. As depicted, example system 200 may include at least a display device 202, a second computing device 204, a scaled image 206, a scale 208, and an adjusted scaled image 210.

Display device 202 may refer to a device, or a component integrated in second computing device 204, configured to display scaled image 206. Similar to display module 106, display device 202 may be integrated in a computing device such as a screen of a mobile phone, a tablet computer, a laptop computer, etc. Alternatively, display device 202 may refer to a separate display device that is communicatively coupled to the computing device as, e.g., a monitor of a desktop computer, as shown in FIGS. 2A and 2B.

Second computing device 204 may refer to a device configured to provide data to display device 202, to receive data from display device 202, and/or to process computing tasks. In some examples, second computing device 204 may be configured to receive a scaled version of image 108 from computing device 110 and to transmit the received image to display device 202. Second computing device 204 may include at least one or more input devices that are configured to receive input from the user and further to adjust the size of the received image responsive to the input. In at least some examples, second computing device 204 may be referred to as a display controller.

Scaled image 206 may refer to a scaled version of image 108 that may include at least object A 102 and scale 114. In some example embodiments, the displayed size of scaled image 206 may be different than that of image 108 or the adjusted version of image 108. That is, scaled image 206 may be altered to a different size so that the entirety of scaled image 206 may be displayed on a screen of display device 202 as shown in FIG. 2. Thus, since scaled image 206 may be altered, the displayed length of scale 114 on scaled image 206 may not accurately depict the representative length that scale 114 depicts. For example, assuming the representative length of scale 114 is 1 cm, the length of scale 114 generated on scaled image 206 may not be 1 cm or even approximate 1 cm as a result of the distortion of scaled image 206.

Scale 208 may refer to a visible line that depicts the same representative length as scale 114. Further, scale 208 may be displayed to be a line that is of the representative length on display device 202, i.e., the displayed length of scale 208 may be the same as the representative length that scale 208 depicts. In some examples, scale 208 may be displayed on the screen of display device 202 in accordance with currently existing computer-executable methods. For example, as set forth above, a ruler in the margin of a Microsoft Word® document may be displayed in its actual size when the zoom level thereof is set to 100%. In some other examples, scale 208 may be marked on a physical frame of display device 202, e.g., marked on a physical frame of a computer monitor. Further, scale 208 may be generated either vertically or horizontally relative to the physical frame of display device 202.

Adjusted scaled image 210 may refer to an adjusted version of scaled image 206. In accordance with at least some examples, second computing device 204 may be configured to adjust or calibrate a size of scaled image 206, responsive to one or more inputs from a viewer who may or may not be the user of computing device 110, such that the displayed length of scale 114 in adjusted scaled image 210 is substantially the same length as scale 208. For example, the viewer may zoom or pan scaled image 206 with the intention that scale 114 and scale 208 are of equal length, from a viewer's perspective. Thus, object A 102 in adjusted scaled image 210 may be visualized to at least approximate its actual size.

In further examples, the actual size of object A 102 may be estimated by second computing device 204 based on the representative length of scale 114 and the actual count of pixels of scale 114 in adjusted scaled image 210.

Figure 3:
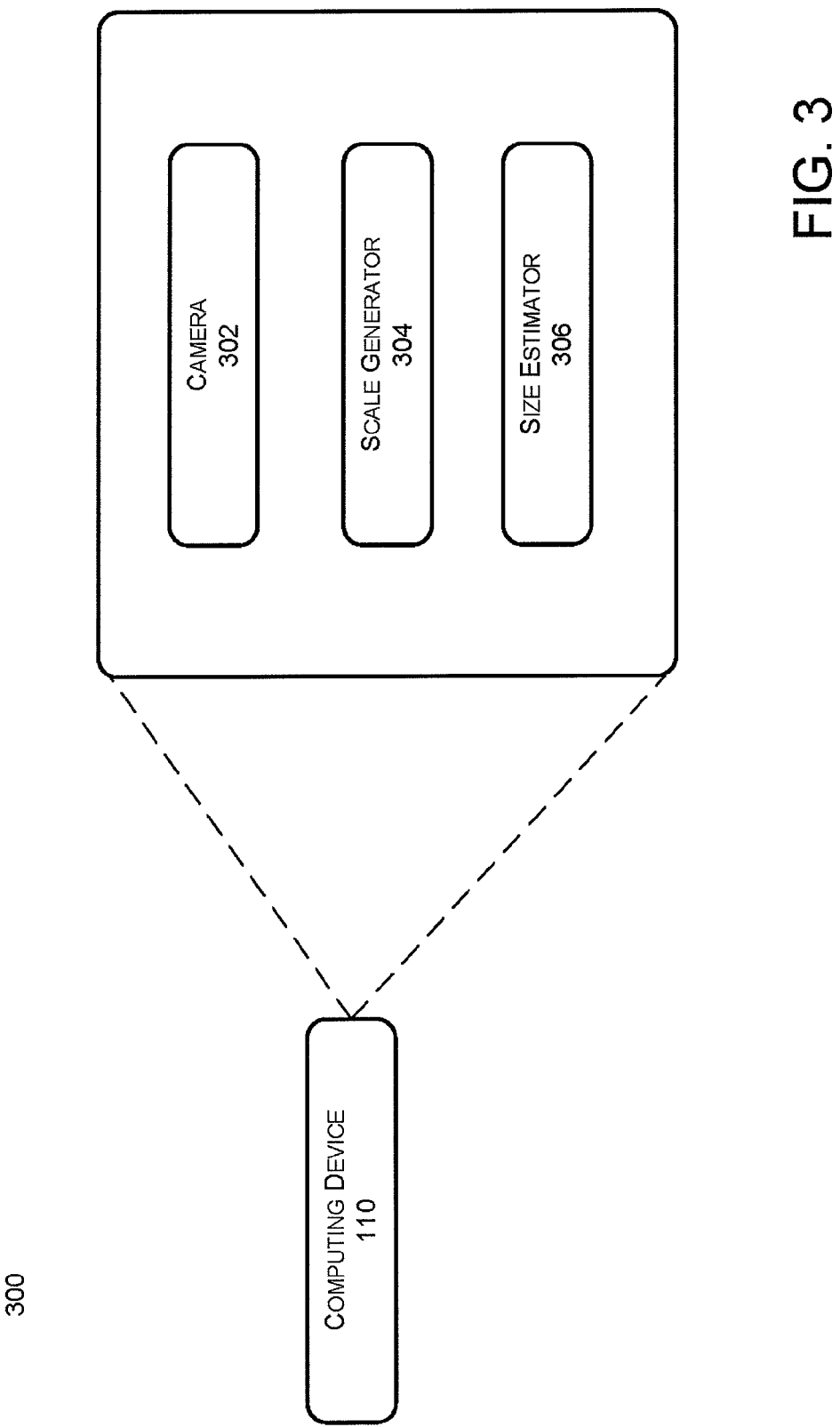
FIG. 3 shows an example configuration of computing device by which visualization of size of objects may be implemented.

FIG. 3 shows an example configuration of computing device 110 by which visualization of size of objects maybe implemented, arranged in accordance with at least some embodiment described herein. As depicted, computing device 110 may include, at least, a camera 302, a scale generator 304, and a size estimator 306.

Camera 302 may refer to an optical device configured to record image 108 that may be stored directly to another device and/or transmitted to another device. In some examples, image 108 may be stored to a data storage of computing device 110 and/or transmitted to display device 202.

Scale generator 304 may refer to a component configured to generate, establish, or draw scale 114. In some examples, responsive to one or more inputs from the user, scale generator 304 may be configured to generate scale 114 on the adjusted version of image 108 to produce a scaled version of image 108 to include object A 102 and scale 114. In at least some examples, scale generator 304 may be configured to juxtapose scale 114 to object A 102 responsive to one or more user inputs. Non-limiting examples of such user inputs may include dragging or moving scale 114 substantially close to object A 102. In accordance with various embodiments, scale generator 304 may be implemented as hardware, software, firmware of a combination thereof.

Size estimator 306 may refer to a component configured to estimate an actual size of object A 102 based on, the representative length of scale 114, an actual count of pixels of scale 114 in the adjusted version of image 108, and an actual count of pixels of object A 102. For example, the representative length of scale 114 may be 1 cm, which may be the length equivalent 100 pixels in the adjusted version of image 108. Further to the example, while the length of object A 102 may be equivalent to that of 200 pixels in the same direction as scale 114, size estimator 306 may estimate that the length of object A 102 is 2 cm, i.e., 200 pixels divided by 100 pixels and multiplied by 1 cm. That is, the length of the belt buckle in image 108 may be estimated to be 2 cm. Thus, the size of object A 102 may be estimated based on the ratio of the representative length of scale 114 and the count of pixels of scale 114.

In yet further examples, similarly, computing device 110 may be configured to estimate the actual size of one of other objects visualized by image 108, e.g., object B 104. Such estimates may also be made based on the representative length of scale 114, the actual count of pixels of scale 114, and the actual count of pixels encompassed by object B 104. In accordance with various examples, size estimator 306 may be implemented as hardware, software, firmware, or any combination thereof.

Figure 4:
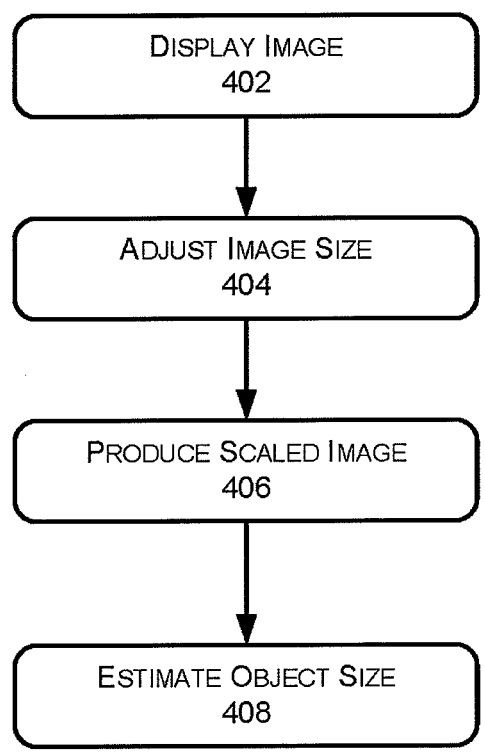
FIG. 4 shows an example configuration of a processing flow of operations by which visualization of size of objects may be implemented.

FIG. 4 shows an example configuration of a processing flow of operations by which visualization of size of objects maybe implemented, all arranged in accordance with at least some embodiment described herein. As depicted, processing flow 400 may include sub-processes executed by various components that are part of example image capturing device 102 and second computing device 204. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Display Image) may refer to display module 106 displaying image 108, which may be a visual representation of object A 102. Block 402 may be followed by block 404.

Block 404 (Adjust Image Size) may refer to computing device 110 adjusting the size of image 108 in response to one or more inputs from a user. For instance, image 108 includes a person wearing a belt buckle, and is displayed on display module 106. A user of computing device 110 may zoom in or pan across image 108 on object A 102, e.g., a belt buckle, so that object A 102 is shown in the adjusted version of image 108 to be substantially close to an actual size of object A 102, based on the user's visual approximation. Block 404 may be followed by block 406.

Block 406 (Produce Scaled Image) may refer to computing device 110 generating scale 114 on the adjusted version of image 108 to produce a scaled version of image 108. The scaled version of image 108 may be further transmitted to a second display device, e.g., display device 202, via a second computing device, e.g., second computing device 204. Block 406 may be followed by block 408.

Block 408 (Estimate Object Size) may refer to size estimator 306 estimating the actual size of object A 102 based on the representative length of scale 114 and the actual count of pixels of scale 114 in scaled version of image 108. For example, the representative length of scale 114 may be 1 cm, which may be the length equivalent 100 pixels in the adjusted version of image 108. Further to the example, while object A 102 is the length equivalent of 200 pixels in the same direction as scale 114, size estimator 306 may be configured to estimate that the length of object A 102 is 2 cm, i.e., 200 pixels divided by 100 pixels and multiplied by 1 cm. Thus, the size of object A 102 may be estimated based on the proportion of the representative length of scale 114 and the count of pixels of scale 114.

Thus, scale 114 may be generated on image 108 when object A 102 is displayed to approximate its actual size. A size of object A 102 may then be estimated based on scale 114.

One skilled in the art may appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
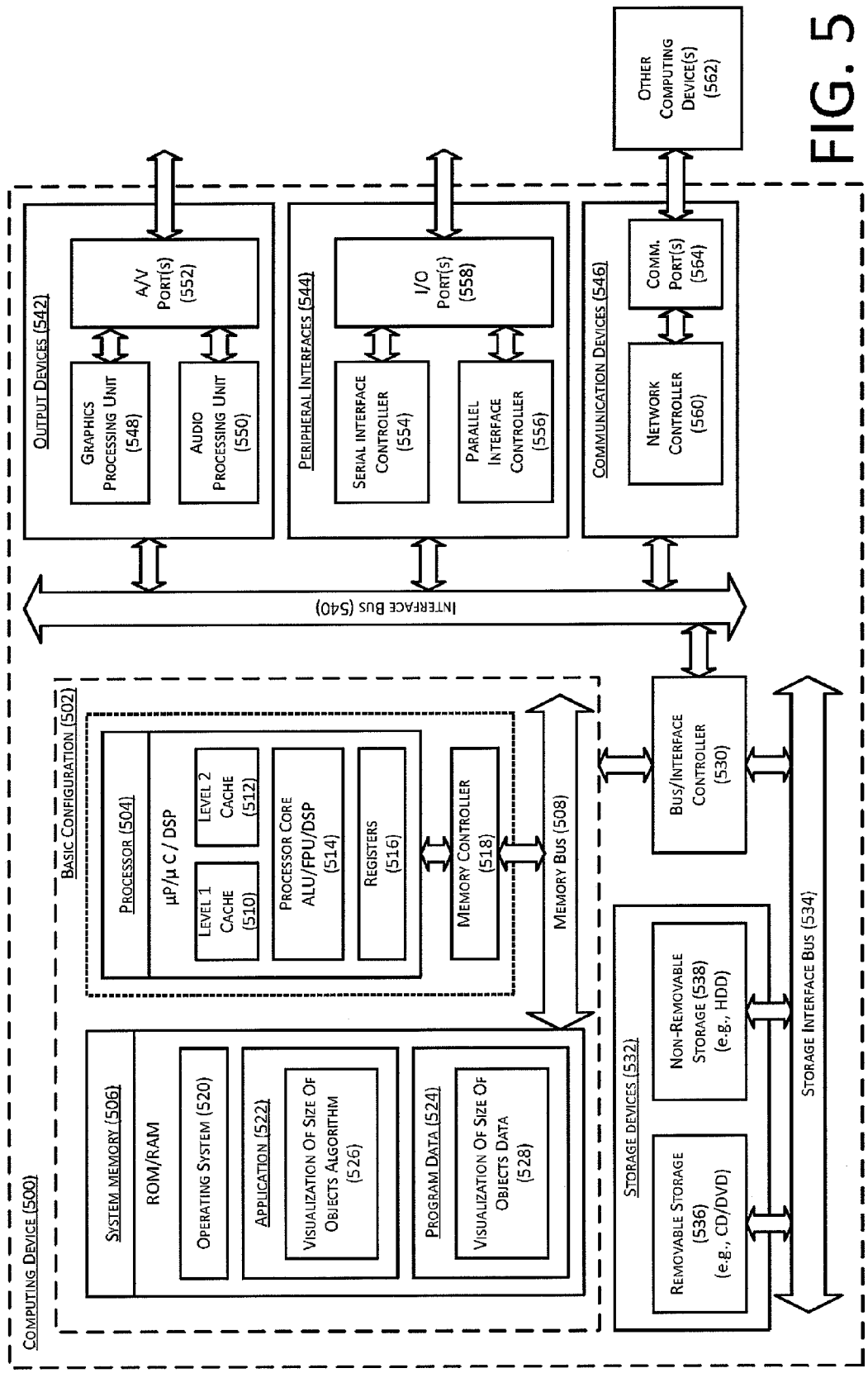
FIG. 5 shows a block diagram illustrating an example computing device that is arranged for visualization of size of objects, all arranged in accordance with at least some embodiment described herein.

FIG. 5 shows a block diagram illustrating an example computing device that is arranged for visualization of size of objects, all arranged in accordance with at least some embodiment described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a visualization of size of objects algorithm 526 that is arranged to perform the functions as described herein including those described with respect to process 400 of FIG. 4. Program data 524 may include visualization of size of objects data 528 that may be useful for operation with visualization of size of objects algorithm 526 as is described herein. In some embodiments, application 522 may be arranged to operate with program data 524 on operating system 520 such that implementations of visualization of size of objects may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to estimate a size of an object based on a digital image thereof, comprising:
    displaying a reference scale associated with a display screen;
    displaying an image that includes the object, and wherein the reference scale and the image are simultaneously viewable on or by the display screen, and the reference scale remains constant in length independent of a size of the displayed image, and wherein the reference scale is located on a physical frame of the display screen;
    responsive to a first input:
        adjusting the displayed image, wherein the object in the adjusted image approximates an actual size of the object; and
    responsive to a second input:
        generating a first scale that depicts a representative length on the image based on the reference scale, such that the actual size of the object is visualized based on the first scale, wherein the representative length is determined based on a number of pixels used to represent the reference scale's length.

2. The method of claim 1, further comprising juxtaposing the first scale to at least a portion of the adjusted displayed image.

3. The method of claim 2, wherein the estimating comprises calculating the size of the object based on a ratio of the first scale to the portion of the adjusted displayed image.

4. The method of claim 1, further comprising:
    receiving the adjusted displayed image, with the first scale displayed thereon, at a computing device;
    displaying the received image, with the first scale displayed thereon, on a second display screen associated with the computing device, the second display screen having an indication of a second scale; and
    responsive to a third input, calibrating the displayed image, wherein the first scale displayed on the image approximates the second scale.

5. The method of claim 1, further comprising estimating the actual size of the object based on the first scale.

6. The method of claim 1, wherein the first input comprises at least one of zooming or panning relative to the displayed image.

7. A non-transitory computer-readable medium that stores executable instructions that, in response to execution, cause one or more processors to perform operations comprising:
    display an image that includes at least an object on a display screen;
    determine a representative length based on a number of pixels used to represent a length of a reference scale located on a physical frame of the display screen, wherein the reference scale and the image are simultaneously viewable on or by the display screen, and the reference scale remains constant in length independent of a size of the displayed image;
    responsive to a first input, adjust the displayed image, wherein the object in the adjusted image approximates an actual size of the object; and
    responsive to a second input, generate a scale on the image based on the reference scale, wherein the scale depicts the representative length.

8. The non-transitory computer-readable medium of claim 7, wherein the operations further comprise estimating a size of the object based on the scale.

9. The non-transitory computer-readable medium of claim 8, wherein the estimating comprises calculating the size of the object based on a ratio of the scale to a portion of the adjusted displayed image.

10. The non-transitory computer-readable medium of claim 7, wherein the first input is received via a touch screen.

11. The non-transitory computer-readable medium of claim 7, wherein the first input comprises at least one of zooming or panning relative to the displayed image.

12. A non-transitory computer-readable medium that stores executable-instructions that, in response to execution, cause one or more processors to perform operations comprising:
  receive a scaled version of an image that includes a first scale that depicts a known length;
  determine a number of pixels that closely approximates a length of a second scale located on a physical frame of a display screen;
  display the scaled version of the image on the display screen, wherein the second scale and the scaled version of the image are simultaneously viewable on or by the display screen, and the second scale remains constant in length independent of a size of the displayed scaled version of the image; and
  responsive to an input, adjust the size of the scaled version of the image, so that the first scale is represented based on the number of pixels.

13. The non-transitory computer-readable medium of claim 12, wherein the operations further comprise estimating a size of an object included in the scaled version of the image based on the first scale.

14. The non-transitory computer-readable medium of claim 12, wherein the second scale is marked on the physical frame of the display screen.

15. A system, comprising:
  a first display device configured to display a reference scale and display an image that includes at least an object, wherein the reference scale and the image are simultaneously viewable on or by the first display device, and the reference scale remains constant in length independent of a size of the displayed image, and wherein the reference scale is located on a physical frame of the first display device;
  a first display controller configured to:
    responsive to a first input, adjust the size of the image, wherein the object included in the adjusted image approximates an actual size of the object, and
    responsive to a second input, display a first scale on the adjusted image based on the reference scale, the first scale depicting a representative length, wherein the representative length is based on a number of pixels used to represent the reference scale's length;
  a second display device configured to display a second scale and display the image with the first scale displayed thereon, wherein the second scale and the image with the first scale displayed thereon are simultaneously viewable on or by the second display device, and the second scale remains constant in length independent of a size of the displayed image; and
  a second display controller configured to, responsive to a third input, adjust the size of the displayed image such that the first scale approximates the second scale.

16. The system of claim 15, wherein the first display controller is further configured to estimate a size of the object based on the first scale.

17. The system of claim 15, wherein the second display controller is further configured to estimate a size of the object based on the first scale.

18. The system of claim 15, wherein the first display controller is further configured to transmit the adjusted image with the first scale displayed thereon to the second display controller.

* * * * *